April 24, 1962
H. RIEGGER
3,030,804
APPARATUS FOR RECORDING FUEL CONSUMPTION
IN INTERNAL COMBUSTION ENGINES
Filed Sept. 30, 1958
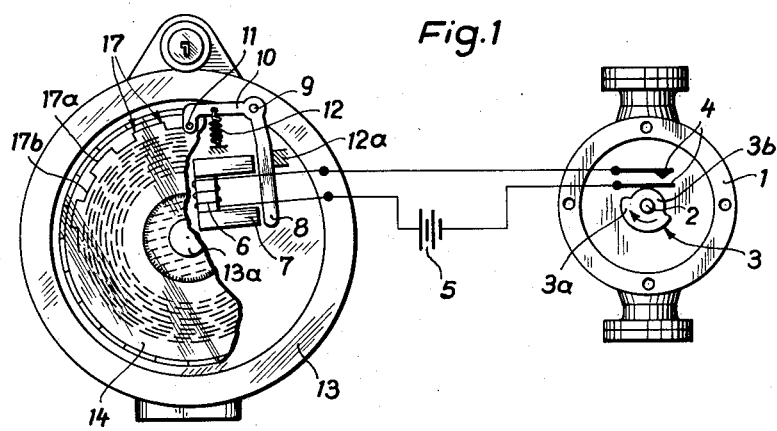
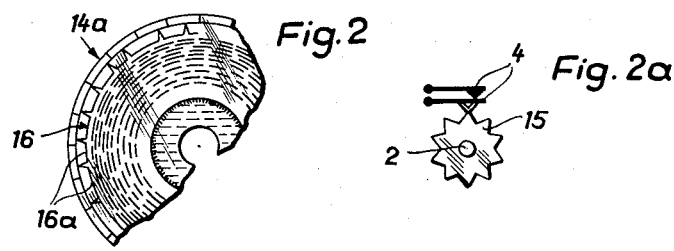 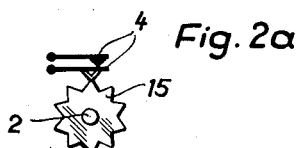
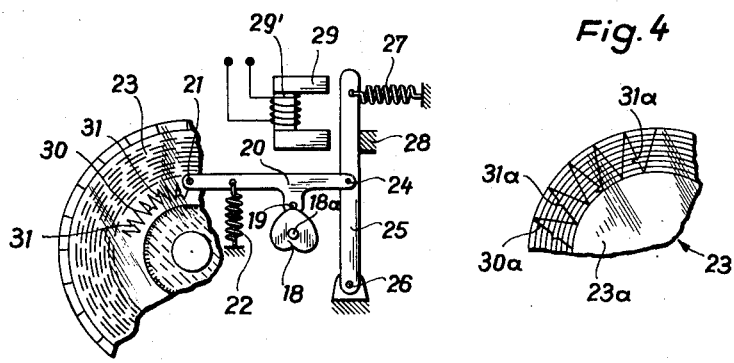 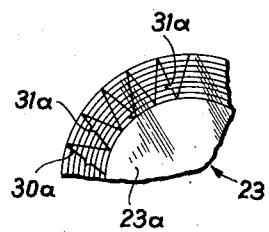
INVENTOR
Hubert Riegger
by:
Michael S. Striker
Attorney

United States Patent Office 3,030,804
Patented Apr. 24, 1962

3,030,804
APPARATUS FOR RECORDING FUEL CONSUMPTION IN INTERNAL COMBUSTION ENGINES
Hubert Riegger, Villingen, Black Forest, Germany, assignor to Firma Kienzle Apparate G.m.b.H., Villingen, Black Forest, Germany
Filed Sept. 30, 1958, Ser. No. 765,016
Claims priority, application Germany Oct. 4, 1957
14 Claims. (Cl. 73—114)

The present invention relates to a composite instrument for recording the fuel consumption of internal combustion engines in automotive vehicles and the like, and more particularly to an odometer which is so combined with a fuel consumption meter or gauge that it records the consumption of unit quantities of fuel simultaneously with recordal of distances covered by the vehicle.

Fuel consumption meters or gauges of known construction generally indicate only the fuel consumption per period of time without, however, simultaneously recording the amount of consumed fuel. It is often very desirable and advantageous to have a control of fuel consumption in dependency on the distance covered by a conveyance or in dependency on the time during which the conveyance is in operation. Of course, it is possible to provide, in addition to the fuel consumption gauge, an independent device for recording the fuel consumption which, however, adds considerably to the cost of instrumentalities in automotive conveyances, often to such an extent as to render the provision of separate or independent recording devices totally uneconomical and hence undesirable.

An important object of the present invention is to provide a fuel consumption meter or gauge which is so combined with a device for recording quantities other than the amounts of consumed fuel that the latter also records fuel consumption in addition to simultaneously recording the other quantity or quantities for the recordal of which it was originally intended.

Another object of the instant invention is to provide an odometer, i.e. a device for recording mileage covered by an automotive vehicle, which is so combined with a fuel consumption gauge that it can record the amounts of consumed fuel simultaneously with recordal of mileage.

A further object of the invention is to provide a recording device which is driven at a constant speed and whose recording element, in addition to being controlled by an odometer, is simultaneously controlled by a fuel consumption gauge so as to register the consumption of given unit quantities of fuel simultaneously with recordal of total distance or mileage covered by the conveyance and with the mileage covered by the conveyance in units of time.

A still further object of the invention is to provide an odometer whose record receiving element is driven at a constant speed and whose recording element is so combined with a fuel consumption gauge as to record the consumption of given unit quantities of fuel simultaneously with recordal of total mileage and of distances covered by the conveyance per units of time.

The invention is based on the recognition that in certain, especially large, automotive conveyances which are driven by internal combustion, i.e. fuel consuming engines, and which are already equipped with an odometer, e.g. a device for registering the mileage traveled by the conveyance, such registering devices may also be utilized for recording unit quantities of consumed fuel. According to an important feature of the invention, the recording element of the odometer is so combined with a fuel consumption gauge that it, in addition to recording quantities for recordal of which it is specifically constructed, also records the consumption of unit quantities of fuel per given periods of time and/or per given mileage covered by the conveyance.

This is achieved by so connecting the recording element or stylus of the recording device with the fuel consumption meter or gauge that the stylus receives impulses and is caused to deviate from its regular path or position to a deflected position for shorter or longer periods of time whenever the consumption of a unit quantity of fuel is sensed and indicated by one or more components of the fuel consumption gauge. In its preferred form, the connection between the stylus and the gauge comprises an electromagnetic system and a suitable cam so driven by the gauge as to close the circuit of the electromagnet at given intervals whenever a unit quantity of fuel is consumed by the engine. The stylus is mounted on an oscillatable lever which is normally held in a position of rest by a resilient element and which, when the electromagnet is energized in that the cam which is driven by the gauge closes its electric circuit, attracts the lever in such manner that the stylus registers the deviation on a record receiving means, preferably a disk on which the curve plotted by the stylus is recorded.

By suitable selection of means for conveying impulses to the stylus, the latter may be so guided by the fuel consumption gauge that it is merely deflected from its normal position for very short periods of time to thereupon immediately return back into its normal position. On the other hand, it is equally possible, by suitable selection of cam means which controls the circuit of the electromagnet, to maintain the stylus in one position while one unit quantity of fuel is consumed and to thereupon deflect the stylus into a different position while the next unit quantity of fuel is consumed by the engine. The stylus is thereupon again returned to its original position. A curve described by the so guided stylus will consist of sections of uniform length assuming that the recording disc is driven at a uniform speed and the consumption of fuel by the engine is constant.

If the novel impulse conveying means is combined with an odometer whose record receiving element rotates at a constant speed, the arrangement may be such that the gauge influences the position of recording element for very short periods of time to register a deviation or irregularity in the curve plotted on the record receiving element, i.e. a disc, and thereupon immediately permits return of the recording element or stylus to its normal position.

The last mentioned embodiment of my invention may be further modified in such manner that the recording element plots a magnified curve at the rear or reverse side of the disc, the recordals of unit quantities of consumed fuel being made in the form of deflections or irregularities in the plotted curve.

The novel features which are considered as characteristic for the invention are set forth in particular in the appended claims. The invention itself, however, both as to its construction and its method of operation, together with additional objects and advantages thereof, will be best understood from the following description of certain specific embodiments when read in connection with the accompanying drawing, in which:

FIG. 1 is a schematic representation of one embodiment of my improved recording device in which the consumption of unit quantities of fuel is recorded on a disc forming the record receiving element of an odometer, a portion of the disc being broken away;

FIG. 2 is a fragmentary view of a disc with a different curve plotted thereon, the curve indicating at spaced intervals the consumption of unit quantities of fuel;

FIG. 2a illustrates a modified cam forming part of impulse transmitting means which causes the recording element to plot a curve of the configuration shown in FIG. 2;

FIG. 3 illustrates a slightly different embodiment according to which the record receiving disc is driven at a constant speed and the recording element is controlled by an odometer as well as by a fuel consumption meter or gauge, the curve being recorded on the front side of the record receiving element; and FIG. 4 is a fragmentary view of the rear or reverse side of a record receiving element with an enlarged curve plotted thereon.

Referring now in greater detail to the drawing, and first to FIG. 1, the composite instrument therein shown comprises a fuel consumption gauge or meter 1 having a shaft 2 which rotates at an angular speed proportional with the consumption of unit quantities of fuel by an internal combustion engine, e.g. of an automotive conveyance or the like. Shaft 2 carries an impulse conveying element in the form of a cam 3 in whose path is located one of a pair of resilient contacts 4 which latter are inserted in the electric circuit including a source of electrical energy 5 and an electromagnet coil 6. The shaft 2 and cam 3 constitute means for indicating fixed unit quantities of fuel. The source 5 may be a battery or a current generator. Core 7 of the electromagnet coil 6 controls the arm 8 of a two-armed lever which is fulcrumed on a pivot axle or pin 9. The other arm 10 of said lever carries a recording element or stylus 11. Arm 10 is biased by a resilient element 12 which tends to maintain the arm 8 at a certain distance from the electromagnet core 7, i.e. in abutment with a stop 12a. The assembly of elements 6—12a is installed in the housing of a mileage recording device or odometer whose cover or lid 13 removably supports a recording disc 14. The latter is rotated by the odometer shaft 13a.

In operation, the electric circuit of parts 4—6 is automatically opened and closed depending upon whether the enlarged or reduced portion 3a, 3b, respectively, of cam 3 is in contact with the adjacent one of contact elements 4. Core 7 alternately attracts and releases the arm 8 whereby the stylus 11 plots on rotating disc 14 a curve 17 of specific configuration, each of sections 17a, 17b of curve 17 recording or representing a unit quantity of fuel consumed by the engine, the curve in its entirety representing the mileage or distance covered by the conveyance.

The unit quantity of fuel indicated by each section of curve 17, of course, may be selected at will. Thus, as the configuration of cam 3 is such that one half of its peripheral zone is on the enlarged portion 3a and the other half of its peripheral zone is on the reduced portion 3b, and assuming that each revolution of shaft 2 corresponds to the consumption of two quarts of fuel, each of sections 17a, 17b of curve 17 records the consumption of one quart of fuel.

If, however, the cam 3 is replaced by a modified toothed cam 15 shown in FIG. 2a, the instrument will plot a curve 16 which is shown applied to disc 14a in FIG. 2. The difference between curves 16, 17 is that the stylus, while plotting curve 16, deviates only shortly from its normal position in which the circuit of contacts 4, of source 5, and of electromagnet coil 6 is open. Thus, the number of times when the circuit is closed increases but each period during which the circuit is closed is of relatively short duration. The cam 15 having ten teeth, and again assuming that a full revolution of shaft 2 corresponds to the consumption of two quarts of fuel, each section 16a of curve 16 records on disc 14a of FIG. 2 one fifth of a quart of consumed fuel. Of course, as the disc 14a seldom rotates at a uniform speed, the lengths of sections 16a are normally different.

The commercially available mileage recording devices or odometers for automotive conveyances customarily comprise a recording disc which rotates at a constant speed, i.e. it describes a full revolution in a predetermined time period. My invention renders it possible to simultaneously record the consumption of fuel not only in dependency on the total distance covered by the conveyance driven by an internal combustion engine but also in dependency on the time element. This is achieved by moving, by means of the fuel consumption gauge, the stylus which records the distance covered by the conveyance out of its normal path or position for short periods of time, and by thereupon quickly returning the stylus into its normal position, as is illustrated in FIG. 3 which shows a heart cam 18 driven by an odometer here represented by shaft 18a. The cam cooperates with a follower 19 mounted on a lever 20. One end of the lever carries a stylus 21, its other end being pivotally connected with a second lever 25 by means of a pin 24. Lever 25 is swingably mounted on a stationary shaft or pivot axle 26 and is biased by a resilient element 27 to normally abut against a stop 28. The first mentioned lever 20 is biased by a resilient member 22 which maintains follower 19 in permanent contact with the periphery or mantle of heart cam 18. Stylus 21 is in contact with a recording disc 23. As the cam 18 rotates, the stylus 21 describes a zig-zag curve 30 on disc or sheet 23. The spring-biased end of lever 25 is adjacent to the core 29 of an electromagnet coil 29' which latter is inserted in the circuit also comprising a source of electrical energy and spring contacts under the control of a cam rotated by the shaft of a fuel consumption gauge, as described hereinabove in connection with FIG. 1. Thus, in each instance when a predetermined amount of fuel is consumed by the engine, the circuit of coil 29' is closed at least once and the core 29 attracts lever 25 which moves lever 20 whereby the stylus 21 is deflected from its zig-zag course 30 for a short period of time to record the consumption of a given quantity of fuel on the disc 23. The deflections of zig-zag curve 30 under the influence of energized electromagnet 28, 29 are indicated at 31.

FIG. 4 illustrates a further modification according to which an enlarged curve 30a is recorded on the reverse or rear side 23a of disc 23. The advantage of plotting the curve on the reverse side of the disc is in that there is more room for such recordal. Deflections of curve 30a caused by the electromagnet assembly 29, 29' under the influence of the fuel consumption gauge are indicated at 31a. As is known, the stylus records the distance covered by conveyance while the frequency of zig-zag deflections in a unit sector of the disc is indicative of the speed at which the conveyance is driven, i.e. it depends on the number of turns performed by cam 18. The means for plotting the curve 31a on the reverse side of the record sheet may be constructed as is shown in the copending patent application Serial No. 520,551 for "Tachograph" which was filed on July 7, 1955.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptions should and are intended to be comprehended within the meaning and range of equivalence of the following claims.

I claim:

1. An instrument comprising, in combination: an odometer having rotatable record receiving means and recording means having a position of rest and a deflected position; a fuel consumption meter comprising means for indicating consumption of fixed quantities of fuel; and means operatively connected with said indicating means and with said recording means for imparting impulses to the latter in such manner that the recording means is deflected from its position of rest to its deflected position and thereafter from its deflected position back to its position of rest when the consumption of a fixed quantity of fuel is sensed by the indicating means of said meter.

2. For use in a conveyance driven by an internal combustion engine, an instrument comprising, in combination: an odometer having record receiving means driven at a rate proportional with the distance covered by the conveyance and recording means for plotting a curve on said record receiving means, said recording means having a position of rest and a deflected position; a fuel consumption gauge comprising means for indicating consumption of unit quantities of fuel; and means operatively connected with said indicating means and with said recording means for imparting impulses to the latter in such manner that the recording means is successively deflected from its position of rest to its deflected position and thereafter from its deflected position back to its position of rest when the consumption of a unit quantity of fuel is sensed by the indicating means of said gauge.

3. For use in a conveyance driven by an internal combustion engine, an instrument comprising
(1) Rotatable record receiving means driven at a constant speed;
(2) deflectable recording means in contact with said record receiving means;
(3) an odometer operatively connected with and guiding said recording means so that the recording means plots on said record receiving means a curve indicative of the distance covered by the conveyance;
(4) means for constantly biasing said recording means into operative engagement with said odometer;
(5) a fuel consumption gauge comprising means for indicating consumption of unit quantities of fuel;
(6) and means operatively connected with said indicating means and with said recording means for deflecting the latter when the consumption of a unit quantity of fuel is sensed by said indicating means whereby said recording means plots a deflection in the curve on said record receiving means.

4. For use in a conveyance driven by an internal combustion engine, an instrument comprising, in combination: an odometer having rotatable record receiving means driven at a rate proportional with the distance covered by said conveyance and recording means in contact with and having a position of rest relative to said record receiving means for plotting thereon a curve indicative of the distance covered by the conveyance and a deflected position; a fuel consumption gauge comprising means for indicating consumption of unit quantities of fuel; means operatively connected with said indicating means and with said recording means for deflecting the latter from its position of rest to said deflected position when the consumption of a unit quantity of fuel is sensed by said indicating means whereby said recording means plots a deflection in the curve on said record receiving means; and means for constantly urging said recording means into the position of rest.

5. An instrument comprising, in combination: odometer means including a rotatable disc and a stylus in contact with said disc, said stylus having a position of rest with respect to said disc whereby it plots a curve on said disc when the latter rotates; a fuel consumption gauge having a shaft driven in such manner that each revolution thereof indicates the consumption of a given unit quantity of fuel; an operative connection between said stylus and said shaft for deflecting the stylus from its position of rest at least once during each revolution of said shaft, said connection comprising an electric circuit including a source of electrical energy, electromagnetic means having a core adjacent to said stylus, contact means adjacent to said shaft, and cam means mounted on said shaft for rotation therewith, said contact means being in the path of said cam means for closing the circuit when engaged by said cam means whereby said electromagnetic means is energized and the core attracts said stylus to move the latter from its position of rest and to cause the stylus to record a deflection in the curve plotted on said disc; and resilient means for constantly urging said stylus into the position of rest.

6. For use in a conveyance driven by an internal combustion engine, an instrument comprising, in combination: odometer means including a rotatable disc driven at a rate proportional with the distance covered by said conveyance, and a pivotable lever including a stylus in contact with said disc, said lever having a first position in which said stylus plots a curve on said disc when the latter rotates, and a second position; a fuel consumption gauge having a shaft driven in such manner that each revolution thereof indicates the consumption of a given unit quantity of fuel by the engine of said conveyance; an operative connection between said lever and said shaft for deflecting the lever into said second position at least once during each revolution of said shaft, said connection comprising an electric circuit including a source of electrical energy, an electromagnet having a core adjacent to said lever, contact means adjacent to said shaft, and cam means mounted on said shaft for rotation therewith, said contact means being in the path of said cam means for closing said circuit when engaged by said cam means whereby said electromagnet is energized and the core attracts said lever to move the latter ino said second position in which the stylus is caused to record a deflection in the curved plotted on said disc; and resilient means connected with said lever in such manner as to constantly urge the latter into said first position.

7. For use in a conveyance driven by an internal combustion engine, an instrument comprising, in combination: odometer means including a rotatable disc driven at a rate proportional with the distance covered by said conveyance, and a pivotable two-armed lever including a stylus connected to one arm thereof and in contact with said disc, said lever having a first position in which said stylus plots a curve on said disc when the latter rotates, and a second position; a fuel consumption gauge having a shaft driven in such manner that each revolution thereof indicates the consumption of a given unit quantity of fuel by the engine of said conveyance; an operative connection between said lever and said shaft for deflecting the lever into said second position at least once during each revolution of said shaft, said connection comprising an electric circuit including a source of electrical energy, an electromagnet having a core adjacent to the other arm of said lever, contact means adjacent to said shaft, and cam means mounted on said shaft for rotation therewith, said contact means being in the path of said cam means for closing said circuit when engaged by said cam means whereby said electromagnet is energized and the core attracts the last mentioned arm of said lever to move the lever into said second position in which the stylus is caused to record a deflection in the curve plotted on said disc; and resilient means connected with one of said arms in such manner as to constantly urge the lever into said first position.

8. For use in a conveyance driven by an internal combustion engine, an instrument comprising, in combination: odometer means including a rotatable disc driven at a constant speed, and a pivotable lever including a stylus in contact with said disc, said lever having a first position in which said stylus plots a curve on said disc when the latter rotates, and a second position; a fuel consumption gauge having a shaft driven in such manner that each revolution thereof indicates the consumption of a given unit quantity of fuel by the engine of said conveyance; an operative connection between said lever and said shaft for deflecting the lever into said second position at least once during each revolution of said shaft, said connection comprising an electric circuit including a source of electrical energy, an electromagnet having a core adjacent to said lever, contact means adjacent to said shaft, and cam means mounted on said shaft for rotation therewith, said contact means being in the path of said cam means for closing said circuit when engaged by said cam means whereby said electromagnet is energized and the core attracts said lever to move the latter into said second position in which the stylus is caused to record a deflection in the curve plotted on said disc; and resilient means connected with said lever in such manner as to constantly urge the latter into said first position.

9. For use in a conveyance driven by a fuel consuming engine, a composite instrument comprising, in combination: a disc driven at a constant speed; a first lever having a first end and a second end; a stylus connected with said first end and in permanent contact with said disc for plotting a curve thereon when the disc rotates; a follower connected with the lever intermediate said first and said second end; an odometer; a heart cam connected with said odometer and driven thereby at a speed proportional with the distance covered by said conveyance, said cam having a peripheral zone in contact with said follower; a resilient member connected with said lever for constantly urging the follower into contact with the peripheral zone of said cam; a second lever having a first end and a second end; a stationary pivot axle connected with the first end of said second lever; means for pivotally connecting the second end of said first lever with said second lever intermediate the first and the second end of said second lever; a stop; resilient means connected with said second lever for constantly urging the latter into contact with said stop; a fuel consumption gauge having a shaft so rotated that each of its revolutions indicates the consumption of a unit quantity of fuel by said engine; and an operative connection between said shaft and the second end of said second lever, said connection including a cam mounted on said shaft for rotation therewith, and an electric circuit including a source of electrical energy, an electromagnet having a core adjacent to the second end of said second lever, and contact means in the path of said last mentioned cam for closing the circuit and energizing said electromagnet when acted upon by said last mentioned cam whereby said core attracts the second end of said second lever and the latter pivots said first lever in such manner that the stylus records a deflection in the curve plotted on said disc.

10. For use in a conveyance driven by a fuel consuming engine, a composite instrument comprising, in combination: a disc driven at a constant speed; a first lever having a first end and a second end; a stylus connected with said first end and in permanent contact with said disc for plotting a curve thereon when the disc rotates; a follower connected with the lever intermediate said first and said second end; an odometer; a first cam connected with said odometer and driven thereby at a speed proportional with the distance covered by said conveyance, said cam having a peripheral zone; means for biasing said lever in such manner that the follower is in permanent contact with the peripheral zone of said cam; a second lever having a first end and a second end; a stationary pivot axle connected with the first end of said second lever; means for pivotally connecting the second end of said first lever with the second lever intermediate the first and the second end of said second lever; a stop; means so connected with said second lever as to constantly urge same into contact with said stop; a fuel consumption gauge having a shaft so rotated that each of its revolutions indicates the consumption of a fixed quantity of fuel by said engine; and an operative connection between said shaft and the second end of said second lever, said connection including a second cam mounted on said shaft for rotation therewith, and an electric circuit including a source of electrical energy, an electromagnet having a core adjacent to the second end of said second lever, and contact means in the path of said second cam for closing the circuit and energizing said electromagnet when acted upon by said second cam whereby the core attracts the second end of such second lever and the latter pivots said first lever in such manner that the stylus records a deflection in the curve plotted on said disc.

11. For use in a conveyance driven by a fuel consuming engine, a composite instrument comprising, in combination: a disc driven at a constant speed; a first lever having a first end and a second end; a stylus connected with said first end and in permanent contact with said disc for plotting a curve thereon when the disc rotates; a follower connected with the lever intermediate said first and said second end; an odometer; a first substantially heart-shaped cam connected with said odometer and driven thereby at a speed proportional with the distance covered by said conveyance, said cam having a peripheral zone; means for biasing said lever in such manner that the follower is in permanent contact with the peripheral zone of said cam whereby said stylus is caused to plot a zig-zag curve on said disc; a second lever having a first end and a second end; a stationary pivot axle connected with the first end of said second lever; means for pivotally connecting the second end of said first lever with the second lever intermediate the first and the second end of said second lever; a stop; means so connected with said second lever as to constantly urge same into contact with said stop; a fuel consumption gauge having a shaft so rotated that each of its revolutions indicates the consumption of a fixed quantity of fuel by said engine; and an operative connection between said shaft and the second end of said second lever, said connection including a second cam mounted on said shaft for rotation therewith, said second cam having a plurality of teeth, and an electric circuit including a source of electrical energy, an electromagnet having a core adjacent to the second end of said second lever, and contact means in the path of said second cam for closing the circuit and energizing said electromagnet when acted upon by the teeth of said second cam whereby the core attracts the second end of said second lever and the latter pivots said first lever in such manner that the stylus records a deflection in the zig-zag curve plotted on said disc.

12. For use in a conveyance driven by a fuel consuming engine, a composite instrument comprising, in combination: odometer means including a rotatable disc driven at a rate proportional with the distance covered by said conveyance, and a lever having a first arm and a second arm; a stylus connected with one of said arms and in permanent contact with said disc for plotting a curve thereon when the disc rotates; means for pivotally supporting said lever intermediate said arms thereof; a stop; resilient means for biasing the lever in such manner as to constantly urge same into abutment with said stop; a fuel consumption gauge having a shaft driven in such manner that each revolution thereof indicates the consumption of a given quantity of fuel by said engine; a cam mounted on said shaft for rotation therewith; an electric circuit including a pair of normally open spring contacts in the path of and adapted to be closed by said cam, a source of electrical energy, and an electromagnet having a core adjacent to the second arm of said lever, the instrument operating in such manner that, when the contacts are closed by said cam the core of said electromagnet attracts the second arm in a direction such as to move the lever away from said stop whereby the stylus records a deflection in the curve plotted on said disc, said resilient means returning the lever into abutment with said stop when the cam releases said contacts to open the circuit and deenergize said electromagnet.

13. For use in a conveyance driven by a fuel consuming engine, a composite instrument comprising, in combination: odometer means including a rotatable disc driven at a rate proportional with the distance covered by said conveyance, and a lever having a first arm and a second arm; a stylus connected with one of said arms and in permanent contact with said disc for plotting a curve thereon when the disc rotates; means for pivotally supporting said lever intermediate said arms thereof; a stop; resilient means for biasing the lever in such manner as to constantly urge same into abutment with said stop; a fuel consumption gauge having a shaft driven in such manner that each revolution thereof indicates the consumption of a given quantity of fuel by said engine; a toothed cam mounted on said shaft for rotation therewith; an electric circuit including a pair of normally open spring contacts in the path of and adapted to be closed by the teeth of said cam, a source of electrical energy, and an electromagnet having a core adjacent to the second arm of said lever, the instrument operating in such manner that, when the contacts are closed by the teeth of said cam the core of said electromagnet attracts the second arm in a direction such as to move the lever away from said stop whereby the stylus records a deflection in the curve plotted on said disc, said resilient means returning the lever into abutment with said stop when the teeth of said cam release said contacts to open the circuit and deenergize said electromagnet.

14. For use in a conveyance driven by a fuel consuming engine, a composite instrument comprising, in combination: odometer means including a rotatable disc driven at a constant rate and a lever having a first arm and a second arm; a stylus connected with one of said arms and in permanent contact with said disc for plotting a curve thereon when the disc rotates; means for pivotally supporting said lever intermediate said arms thereof; a stop; resilient means for biasing the lever in such manner as to constantly urge same into abutment with said stop; a fuel consumption gauge having a shaft driven in such manner that each revolution thereof indicates the consumption of a given quantity of fuel by said engine; a cam mounted on said shaft for rotation therewith; an electric circuit including a pair of normally open spring contacts in the path of and adapted to be closed by said cam, a source of electrical energy, and an electromagnet having a core adjacent to the second arm of said lever, the instrument operating in such manner that, when the contacts are closed by said cam the core of said electromagnet attracts the second arm in a direction such as to move the lever away from said stop whereby the stylus records a deflection in the curve plotted on said disc, said resilient means returning the lever into abutment with said stop when the cam releases said contacts to open the circuit and deenergize said electromagnet.

References Cited in the file of this patent

UNITED STATES PATENTS

| | | |
|---|---|---|
| 1,693,701 | Merrick | Dec. 4, 1928 |
| 1,842,160 | Ford | Jan. 19, 1932 |

FOREIGN PATENTS

| | | |
|---|---|---|
| 543,738 | France | June 9, 1922 |